No. 773,678. PATENTED NOV. 1, 1904.
T. ROBERTSON & E. L. MIDDLEBROOK.
MEANS FOR ATTACHING GLASS PANES TO THEIR FRAMES.
APPLICATION FILED DEC. 21, 1903.
NO MODEL.
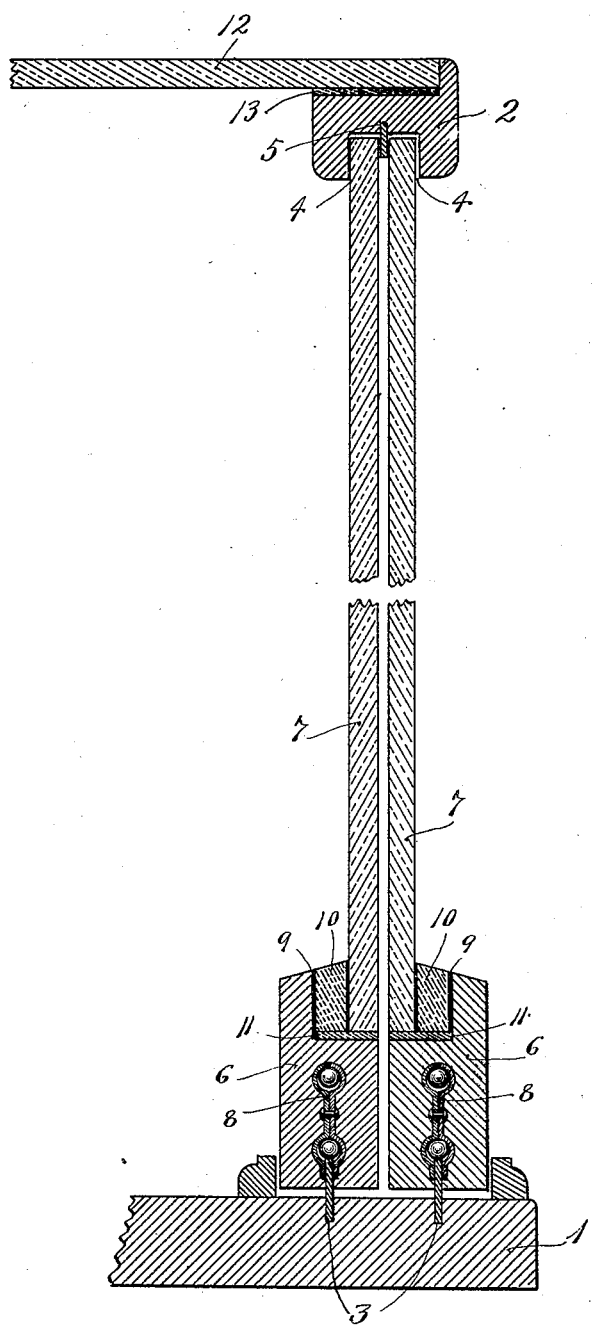
Witnesses.
A. H. Opsahl.
H. P. Kilgore
Inventors'
Thomas Robertson
Elmer L. Middlebrook
By their Attorneys'
Williamson & Merchant.

No. 773,678. Patented November 1, 1904.

UNITED STATES PATENT OFFICE.

THOMAS ROBERTSON AND ELMER L. MIDDLEBROOK, OF MINNEAPOLIS, MINNESOTA.

MEANS FOR ATTACHING GLASS PANES TO THEIR FRAMES.

SPECIFICATION forming part of Letters Patent No. 773,678, dated November 1, 1904.

Application filed December 21, 1903. Serial No. 186,064. (No model.)

*To all whom it may concern:*

Be it known that we, THOMAS ROBERTSON and ELMER L. MIDDLEBROOK, citizens of the United States, residing at Minneapolis, in the county of Hennepin and State of Minnesota, have invented certain new and useful Improvements in Means for Attaching Glass Panes to Their Frames; and we do hereby declare the following to be a full, clear, and exact description of the invention, such as will enable others skilled in the art to which it appertains to make and use the same.

Our present invention relates particularly to show-cases, but generally to an improved means for attaching plates of glass to wooden frames or supports.

In show-cases and other places it is desirable to secure plates of glass to their frames or wooden supports without requiring the glass plates to be perforated, and in many places it is extremely desirable to thus secure panes of plate-glass with one surface thereof completely exposed. Hence attempts have been made to secure the plates of glass to wooden frames or supports directly by cement or adhesive material; but this has proved unsuccessful both because of the uneven expansion of wood and glass and because with the parts thus unyieldingly attached and especially when the parts are movable and are liable to be brought to an abrupt stop the glass is subjected to sudden jars or strains tending to loosen it from its support and frequently causing breaking of the glass.

To overcome these objections, we interpose yielding strips between the glass and their frames or supports and cement these yielding strips both to the glass and to the said frames or supports. Strips of rubber best serve this purpose; but strips of other yielding material, such as felt or leather, may in some instances be employed. These yielding strips permit the uneven expansions of the glass and of their supports and afford cushions which prevent breaking of the glass, even under quite intense jars or strains applied to the said supporting-frames.

In the accompanying drawing our invention is shown as applied to connect the sliding glass doors of a show-case to their upper and lower wooden supporting-strips, and in this specific application our invention involves a novel manner of disposing the glass sections or doors with respect to their supporting-strips so that the two glass panes may pass each other very closely.

The invention is illustrated in the accompanying drawing, wherein like characters indicate like parts throughout the view.

The single view of the drawing is a vertical section through a portion of the show-case and showing particularly a pair of sliding glass doors, the same being secured at their lower edges to supporting-strips in accordance with our invention.

The numeral 1 indicates the bottom board, and the numeral 2 the top rail, of an ordinary show-case, the former having a pair of parallel guide-rails 3 and the latter having in its under surface a guide-groove 4 and an intermediately-located spacing-strip 5.

The numeral 6 indicates the wooden supporting-strips for the glass door-panes 7, which strips are attached, as shown, only to the lower portions of said panes. As shown, the supporting-strips 6 are provided with ball-bearing devices 8, which are set into the same and run upon the rails 3 in the usual way. These ball-bearing devices, however, form no part of our present invention. The supporting-strips 6 are formed with longitudinally-extended rabbets 9, which receive the adjacent lower edges of the door-panes 7 and also the interposed rubber strips 10 and 11. As already indicated, these cushioned strips 10 and 11 are by suitable cement securely attached both to the glass door-panes and to their wooden supporting-strips 6. The door-panes 7, it will be noted, lie flush with the inner edges of their supporting-strips 6, so that the inner surfaces of said panes lie very close together, and hence pass each other with but very little clearance. At their upper edges the door-panes 7 are guided and spaced apart from each other by the groove 4 and spacing-strip 5 of the upper rail 2. The horizontal top plate 12 of the show-case is also in accordance with our invention secured to the wooden rail 2 by an interposed rubber strip 13, which is suitably cemented to the said parts 2 and 12.

From what has been said it will of course be understood that our invention is capable of modification and to a large variation of arrangement in different applications.

What we claim, and desire to secure by Letters Patent of the United States, is as follows:

1. The combination with a glass pane or section and a frame or support therefor, of a yielding strip interposed between said glass pane or section and its frame or support, and united to both thereof by an adhesive material.

2. The combination with a glass pane or section and a frame or support, of rubber cushion-strips interposed between said pane of glass and its supporting-frame, and united to both thereof by adhesive material.

3. A pair of sliding doors comprising the glass panes 7, the rabbeted supporting-strips 6, and the yielding cushion-strips interposed between the edges of the said panes of glass and the rabbets of said strips, and united to both thereof by adhesive material, the inner surfaces of said panes lying substantially flush with the inner surfaces of said supporting-strips, substantially as described.

In testimony whereof we affix our signatures in presence of two witnesses.

THOMAS ROBERTSON.
ELMER L. MIDDLEBROOK.

Witnesses:
   ELIZABETH H. KELIHER,
   F. D. MERCHANT.